July 11, 1950 — P. S. HOLMBERG — 2,514,605
ADJUSTABLE TOLERANCE MEASURING TOOL
Filed Nov. 18, 1946
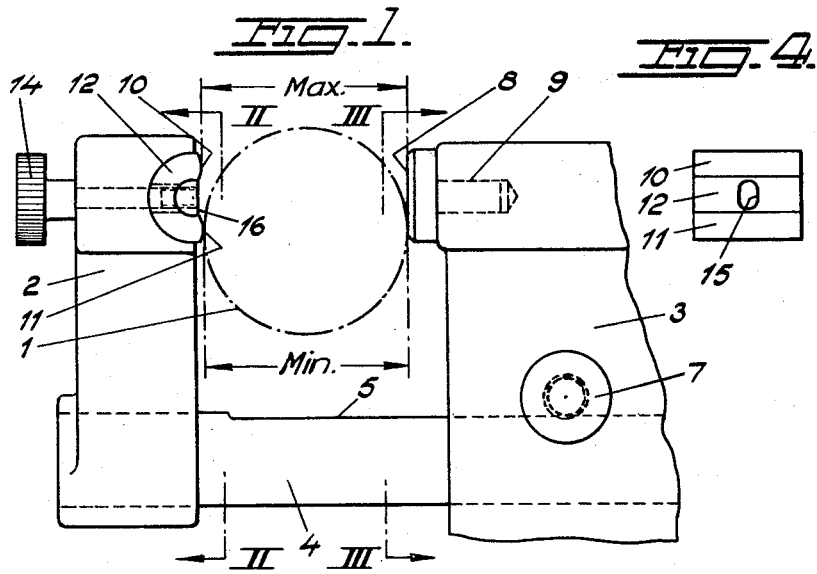
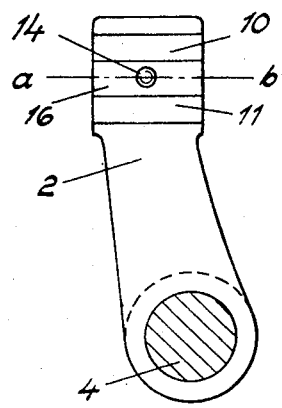
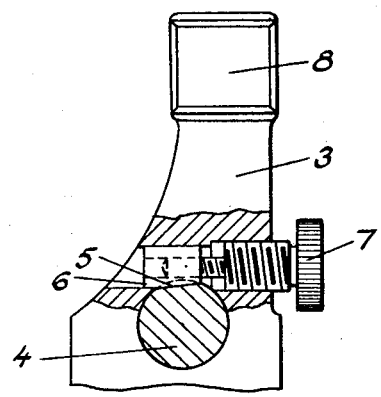
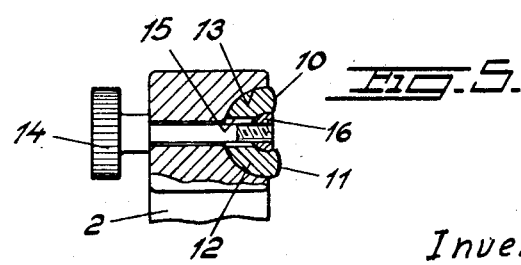
Inventor:
Petrus Samuel Holmberg
by W. Bayard Jones
Attorney

UNITED STATES PATENT OFFICE 2,514,605

ADJUSTABLE TOLERANCE MEASURING TOOL

Petrus Samuel Holmberg, Eskilstuna, Sweden, assignor to Aktiebolaget C. E. Johansson, Eskilstuna, Sweden, a company of Sweden Application November 18, 1946, Serial No. 710,603
In Sweden November 19, 1945

1 Claim. (Cl. 33—143)

The present invention relates to an adjustable tolerance measuring tool or instrument which is provided in a well-known manner with two shanks, arms, or the like, upon which measuring surfaces are provided, at least one of said shanks or arms being provided with two measuring surfaces, one of which is intended for the maximum measure and the other for the minimum measure. It is the purpose of this invention to provide a measuring tool of this type which is simple and which may be very easily adjusted to desired values of the measures and desired tolerances. With this purpose in view the present measuring tool is mainly characterized by the two measuring surfaces on one of the shanks being provided on a cradle which is rotatably journalled in the said shank or arm in such manner that it is capable of turning about an axis located intermediate the said measuring surfaces, and which is capable of being locked relatively to the shank or arm in various positions of angular adjustment. The cradle may suitably have an approximately semicylindrical shape, and may be journalled by means of a portion at least of its cylindrical surface in a seat of a corresponding shape formed in the shank or arm. The two shanks or arms are arranged in such manner that they are adjustable and capable of being locked at various distances from one another. Preferably, the two measuring surfaces on the cradle have an outwardly curved or convex shape so that correct measuring results will be obtained irrespective of in what angular position the cradle is adjusted relatively to the shank supporting it, and thus also relatively to the measuring surface or surfaces on the other shank.

The accompanying drawing illustrates by way of example a constructional form of the invention. Fig. 1 shows a front view of a tolerance or limit snap gauge according to the invention. Fig. 2 is a section on the line II—II in Fig. 1, and Fig. 3 is a section on the line III—III in Fig. 1. Fig. 4 is a detail view of the abovementioned cradle and its two measuring surfaces viewed from the right in Fig. 1, and Fig. 5 is a cross section through the cradle and the supporting and locking means therefor.

The limit snap gauge illustrated in the drawing is intended for measuring in the usual way, for instance of the diameter of a journal 1 which is indicated in Fig. 1 by a dot and dash circular line. The gauge comprises two shanks or arms 2 and 3 and a connecting bar 4 which is secured to the shank 2 but is slidable and capable of being locked in an aperture of a corresponding shape in the other shank 3. The connecting bar 4 has a generally circular cross section, but is provided at one side with a plane surface 5, and locking of said bar in the shank 3 is effected by means of a nut 6 and a locking screw 7 engaging said nut, both of which are located in a transverse aperture in the shank, said screw when tightened forcing the nut 6 against the plane surface 5 on the bar 4. The shank or arm 3 is provided with a single plane and approximately square measuring surface 8 which is provided on the head of a stud 9 inserted in the shank 3, said surface being located in a plane perpendicular to the longitudinal direction of the bar 4. The shank or arm 2, on the other hand, is provided with two measuring surfaces 10 and 11, the former of which is to serve for the maximum measure and the latter for the minimum measure. According to the present invention, the said two measuring surfaces 10 and 11 are provided on a cradle 12 having a substantially semicylindrical shape and which is rotatably journalled in the shank 2 in such manner that it is capable of rotating about an axis, referenced $a$—$b$ in Fig. 2, which is located intermediate the two measuring surfaces, said cradle being also capable of being locked to the shank 2 in various positions of adjustment. In the constructional form illustrated, the outer surface of the cradle 12, which forms a portion of a cylindrical surface, is journalled in a seat 13 of a corresponding shape in the inner side of the shank 2 opposed to the measuring surface 8 on the shank 3. For locking the cradle 12 in adjusted positions there is provided a locking screw 14 which extends through an aperture in the shank 2 and through an aperture 15, which may have an oval shape, for instance, in the cradle, and is screw-threaded in a locking bar 16 provided in the cradle, in such manner that when the screw 14 is tightened said bar 16 forces the cradle against its seat in the shank 2.

The measuring surfaces 10 and 11 on the cradle 12 are not plane, but have an outwardly curved or convex shape, as shown in Figs. 1 and 5, whereby a suitable and definite line of contact is always obtained between each measuring surface and the article to be measured, irrespective of the adjustment of the cradle.

For effecting adjustment of the limit snap gauge above described to the desired measures and tolerances, the locking screw 14 is unscrewed sufficiently to allow the cradle 12 to turn in its seat about the axis $a$—$b$, and the locking screw 7 is also unscrewed sufficiently to allow the shank 3 to be displaced along the bar 4 in a direction towards or away from the shank 2. An assembly of gauge blocks possessing the desired minimum measure, e. g. 39.995 mm., is then inserted between the measuring surface 11 on the cradle and the plane measuring surface 8 on the shank 3, and a second assembly of gauge blocks possessing the desired maximum measure, e. g. 40.005 mm., is inserted between the measuring surface 10 on the cradle and the measuring surface 8. The shank 3 is then displaced towards the shank 2 as far as the two assemblies of gauge blocks will allow, which results in the cradle 12 automatically adjusting itself to the correct position, so that the desired values of the maximum measure and of the minimum measure are obtained, viz. one measure referenced "max" in Fig. 1, between a line on the measuring surface 10 and the measuring surface 8, and a second measure referenced "min" in Fig. 1, between a line of the measuring surface 11 and the measuring surface 8, respectively. All that is necessary, therefore, is again to tighten the locking screws 14 and 7 after which the measuring instrument is ready to be used as an ordinary limit snap gauge.

The constructional form above described and illustrated in the drawing is only to be regarded as an example, and it will be understood that the details thereof may be modified in several ways without departing from the principle of the invention. Thus it is possible, for instance, instead of giving the aperture 15 in the cradle 12 the oval shape shown in Fig. 4, to make said aperture of circular shape with a diameter so much larger than that of the screw 14 that it renders the necessary adjustment of the cradle possible.

I claim:

An adjustable tolerance measuring tool, comprising in combination two shanks movably connected to one another so as to be adjustable towards and away from one another, means for locking said shanks to one another in adjusted positions, at least one of said shanks having two measuring surfaces, the second shank having at least one measuring surface opposed to said measuring surfaces on said first mentioned shank, said first mentioned shank having a seat formed by a substantially semicylindrical surface the axis of which lies in a plane perpendicular to the direction of relative movement between said two shanks, a cradle supporting said two measuring surfaces of the first mentioned shank and having a substantially semicylindrical shape seated in said seat in said shank so as to be capable of turning relatively thereto about said axis of said seat, said two measuring surfaces on said cradle extending substantially parallel to said axis of said seat and being located on opposite sides thereof whereby rotation of said cradle causes movement of one of said measuring surfaces towards the measuring surface on the second shank and movement of the other measuring surface on said cradle away from the measuring surface on the second shank, said measuring surfaces on said cradle consisting of parallel ridges having an outwardly curved shape, and means for locking said cradle to said shank in various positions of angular adjustment.

PETRUS SAMUEL HOLMBERG.

REFERENCES CITED

The following references are of record in the file of this patent:

UNITED STATES PATENTS

| Number | Name | Date |
| --- | --- | --- |
| 1,174,052 | Burdick | Mar. 7, 1916 |
| 1,489,577 | Hanson | Apr. 8, 1924 |
| 1,531,357 | Tautz | Mar. 31, 1925 |
| 1,574,735 | Paloski | Feb. 23, 1926 |
| 1,817,637 | Miller | Aug. 4, 1931 |
| 1,952,190 | Wells | Mar. 27, 1934 |
| 2,401,951 | Martinec | June 11, 1946 |

FOREIGN PATENTS

| Number | Country | Date |
| --- | --- | --- |
| 517,128 | France | Dec. 13, 1920 |

OTHER REFERENCES

"Super Snap Gage" Folder, Standard Gage Co., Inc., Poughkeepsie, N. Y. Rec'd. June 3, 1943, U. S. Pat. Off.